(12) United States Patent
Fahey et al.

(10) Patent No.: US 12,069,151 B2
(45) Date of Patent: Aug. 20, 2024

(54) SYSTEMS AND METHODS FOR AUTOMATIC AND SELECTIVE REMOTE MOBILE DEVICE DATA EXTRACTION

(71) Applicant: Cellebrite, Inc., Vienna, VA (US)

(72) Inventors: Andrew Lawrence Fahey, Driftwood, TX (US); Lisa Neyen, Beacon, NY (US); Frank Lin, Shoreline, WA (US); Alex Druker, Zichron Yaakov (IL); Boris Lipschitz, Edgewater, NJ (US); Joshua Barone, Kenner, LA (US)

(73) Assignee: Cellebrite, Inc., Vienna, VA (US)

( * ) Notice: Subject to any disclaimer, the term of this patent is extended or adjusted under 35 U.S.C. 154(b) by 0 days.

(21) Appl. No.: 18/473,763

(22) Filed: Sep. 25, 2023

(65) Prior Publication Data
US 2024/0106917 A1    Mar. 28, 2024

Related U.S. Application Data

(60) Provisional application No. 63/410,798, filed on Sep. 28, 2022.

(51) Int. Cl.
*G06F 16/25* (2019.01)
*H04L 67/60* (2022.01)

(52) U.S. Cl.
CPC .................................. *H04L 67/60* (2022.05)

(58) Field of Classification Search
None
See application file for complete search history.

(56) References Cited

U.S. PATENT DOCUMENTS

| | | | |
|---|---|---|---|
| 10,740,858 B2* | 8/2020 | McCreight | G06Q 50/26 |
| 2019/0052105 A1 | 2/2019 | Wang et al. | |
| 2020/0218546 A1* | 7/2020 | Aggarwal | G06F 9/4416 |
| 2021/0133904 A1* | 5/2021 | Saliba | G06F 16/182 |
| 2022/0043907 A1* | 2/2022 | Saliba | G06F 21/552 |
| 2022/0353295 A1* | 11/2022 | Yeh | H04L 63/029 |
| 2023/0023798 A1* | 1/2023 | Palazzo | G06F 16/254 |
| 2023/0216947 A1* | 7/2023 | Bernardi | H04L 63/10 |
| | | | 713/150 |

OTHER PUBLICATIONS

Remote Mobile Collection for Corporate Investigations. website (online). Cellebrite, (retrieved on Feb. 17, 2022. Retrieved from https://www.forensicfocus.com/webinars/remote-mobile-collection-for-corporate-investigations. Cellebrite Feb. 17, 2022 (Feb. 17, 2022).
International Search Report and Written Opinion for PCT Application No. PCT/IB2023/059609 dated Jan. 10, 2024.

* cited by examiner

*Primary Examiner* — Natisha D Cox
(74) *Attorney, Agent, or Firm* — PEARL COHEN ZEDEK LATZER BARATZ LLP (57) ABSTRACT

A system and method for automatic remote mobile device data extraction is provided. The system and method can include transmitting a request to extract data from a server at a first location to a computer that is at a second location, where the mobile device is connected to the computer. A web link and an activation code can be provided that allows for downloading an agent application on the computer to assist with the request, and a list of exact data elements to be extracted can also be provided. The data can be extracted from the mobile device and sent to the server.

17 Claims, 11 Drawing Sheets

SYSTEMS AND METHODS FOR AUTOMATIC AND SELECTIVE REMOTE MOBILE DEVICE DATA EXTRACTION

CROSS REFERENCE TO RELATED APPLICATION

This application claims priority to and the benefit of U.S. Provisional Application No. 63/410,798, filed on Sep. 28, 2022, the entire contents of which are incorporated herein by reference in their entirety.

FIELD OF THE INVENTION

The invention relates generally to remote data collection technology. In particular, the invention relates to collecting data remotely from a mobile device.

BACKGROUND OF THE INVENTION

Digital investigations, e-discovery, and/or obtaining digital evidence are just some of the contexts for which obtaining digital data from various devices can be desirable. In some contexts, it can be desirable to obtain information/data that is stored on a mobile device. For example, calls, photos, application data, or text messages on a smart phone.

Current systems typically require that an investigator person physically go to a location that the mobile device exists, or the mobile device owner brings the mobile device to the investigator person, so that the mobile device can connect to a special computing device and download all of the data of the mobile device. In many scenarios, individuals use their mobile device for mixed business and personal use. Thus, for an investigation related to a business purpose, it can be a privacy violation to download the data related to personal use, and in a personal investigation it can be a privacy violation to download the data related to a business use.

Typically, for a situation where the mobile device data of many people must be collected (e.g., e-discovery for a litigation of a corporation), this can be an expensive and time consuming process, as each and every mobile device holder is visited in person for the mobile device data collection to be performed. In some scenarios, the people can be spread out geographically across the country and/or world, further adding to the time and/or expense of the mobile device data collection.

Therefore, it can be desirable to obtain only a selected portion of the data on a mobile device and/or to obtain that data without the investigator person having to physically possess or be in the physical presence of the device.

It can also be desirable to remotely collect mobile data from one or multiple people with none or very little interaction on the part of the mobile data holder.

SUMMARY OF THE INVENTION

Advantages of the invention can include an ability to collect select portions of data from a mobile device. Another advantage of the invention can include an ability to collect data from a mobile device remotely. Another advantage of the invention can include reduction of cost, reduction in effort, and/or reduction in time for collecting data.

Advantages of the invention can also include an ability to perform data collection on the order of hundreds of mobile devices in parallel. Advantages of the invention can also include an ability to collect a narrower subset of data.

Advantage of the invention can also include the mobile device owner can be anywhere in the world with an internet connection and can have their mobile data collected and securely stored all in a matter of several minutes.

In one aspect the invention involves, a method for automatic remote mobile device data extraction. The method can involve receiving, by the server, a request to initiate a mobile device data extraction, wherein a mobile device connects to a computer, wherein the server is at first location and the mobile device and the computer are at a second location. The method can also involve transmitting, by a server, a web link and an activation code that allows for downloading an agent application on a computer associated with the transmitted request. The method can also involve receiving, by the server, the activation code and a request to download the agent application from a computer. The method can also involve transmitting, by the server, the agent application and a list of exact data elements of a plurality of available data elements to be extracted to the computer running the agent application, wherein the list is based on the activation code. The method can also involve receiving, by the server, the extracted data from the computer running the agent.

In some embodiments, the web link and the activation code are transmitted via email. In some embodiments, the request to download the agent application includes a universal agent to collect mobile device data that is an android or an iOS.

In another aspect, the invention involves a method for automatic remote mobile device data extraction. The method can also involve receiving, by a computer, a download of an agent application. The method can also involve determining, by the computer, whether a mobile device connected to the computer is executing an operating system that is android or iOS. The method can also involve if the mobile device is an android transmitting, by the computer, an android specific agent and a request to collect data to the mobile device. The method can also involve if the mobile device is an iOS transmitting, by the computer, an iOS specific protocol request to collect data to the mobile device. The method can also involve receiving, by the computer, the collected data. The method can also involve transmitting the collected data, by the computer, to a server, wherein the server is at a first location and the mobile device and the computer are at a second location.

In some embodiments, for an android mobile device determining a model type of the android, the method involves modifying, by the android specific agent executing on the computing device, USB settings of the computing device based on the model type.

In some embodiments, if the mobile device is an android deleting, by the computing device, the android specific agent. In some embodiments, if the mobile device is an android connecting via Android Device Bridge to obtain the data from the mobile device specified by the agent application. In some embodiments, if the mobile device is an android connecting via Media Transfer Protocol to obtain media from the mobile device specified by the agent application.

In some embodiments, if the mobile device is executing iOS, determining a model type of the mobile device. In some embodiments, if the mobile device is executing iOS, the method can involve connecting to a lockdown service protocol of the iOS, instantiating a backup protocol of the iOS, and receiving the data from the iOS. In some embodiments, the method involves setting a backup password.

In another aspect, the invention includes a system for automatic remote mobile device data extraction. The system includes a server at a first location to transmit agent applications to computers upon receiving request to perform remote mobile device data extraction. The system can also include a computer at a second location to receive an agent application from the server, connect to a mobile device to extract data from the mobile device and transmit the extracted data to the server, wherein if the mobile device is an android, the computer is further configured to transmit an android specific agent and a request to collect data to the mobile device and if the mobile device is an iOS the computer is further configured to transmit an iOS specific protocol request to collect data to the mobile device, wherein the computer is further configured to receive the collected data from the mobile device, and wherein the server is further configured to upon receiving an activation code and a request to download an agent application from the computer, transmit the agent application and a list of exact data elements of a plurality of available data elements to be extracted to the computer running the agent application, wherein the list is based on the activation code.

In some embodiments, the computer is further configured to for an android mobile device, determine a model type of the android and modify, by the android specific agent executing on the computing device, USB settings of the computing device based on the model type.

In some embodiments, if the mobile device is an android, the computer is further configured to delete the android specific agent.

In some embodiments, if the mobile device is an android, the computer is further configured to connect via Android Device Bridge to obtain the data from the mobile device specified by the agent application.

In some embodiments, if the mobile device is an android, the computer is further configured to connecting via Media Transfer Protocol to obtain media from the mobile device specified by the agent application. In some embodiments, if the mobile device is executing iOS, the computer is further configured to determine a model type of the mobile device.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

The mobile data can be selectively chosen automatically, by an examiner, and/or mobile device custodian so that only desired (e.g., pertinent) information is collected rather than, for example, an all or nothing approach. Although it is apparent to one of ordinary skill that the selection can be to collect all the data on the mobile device.

Figure 1:
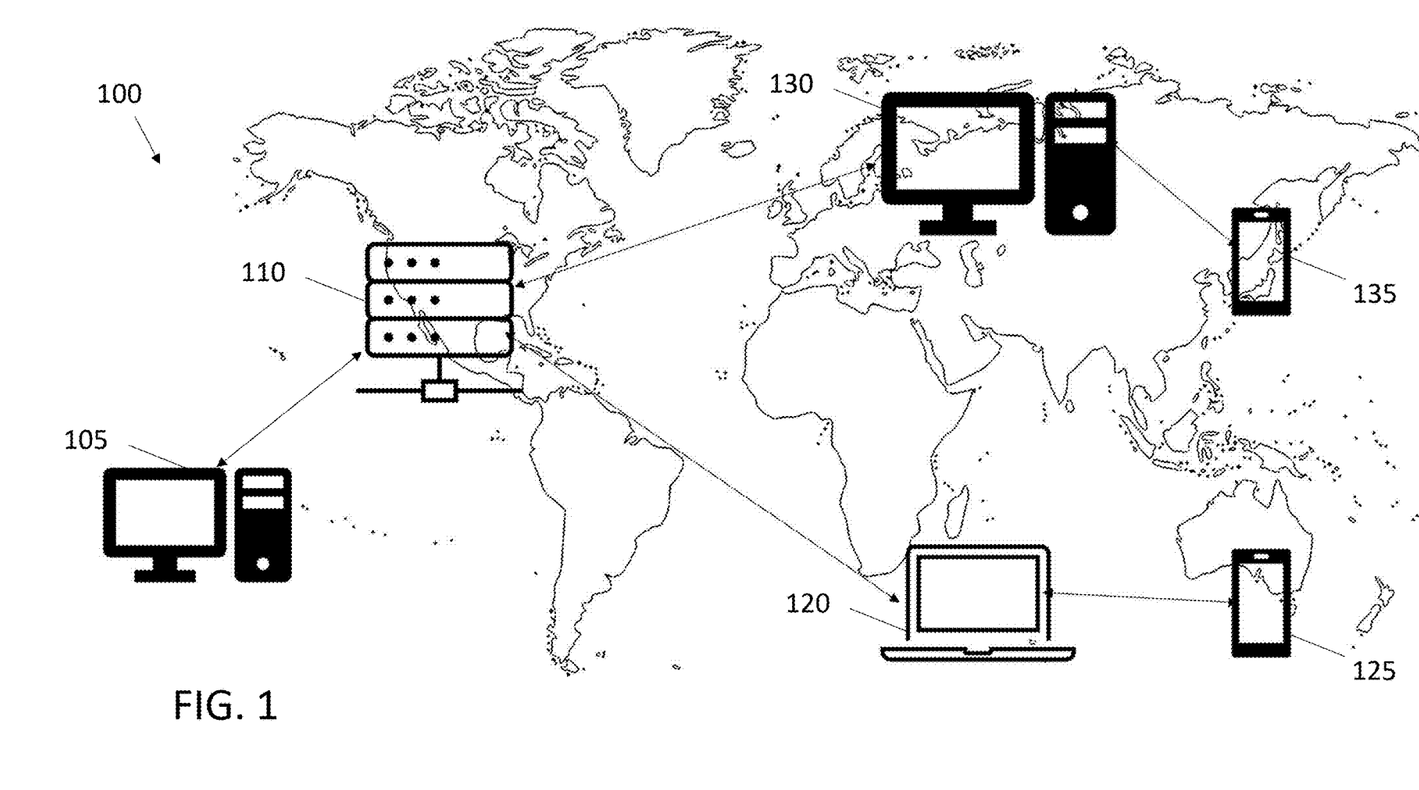
FIG. 1 is a block diagram for a system for automatic remote mobile device data extraction, according to an illustrative embodiment of the invention.

FIG. 1 is a block diagram for a system 100 for automatic remote mobile device data extraction, according to an illustrative embodiment of the invention. The system 100 includes a server 110, a first mobile device 125, a second mobile device 135, a first computer 120, a second computer 130 and a third computer 105.

The server 110 can communicate with the first computer 120, the second computer 130, and the third computer 105.

The third computer 105 can be a desktop computing device. In various embodiments, the third computer 105 can be a laptop, tablet, smartphone or any computing device as is known in the art.

The first computer 120 can be a laptop and the second computer 130 can be a desktop computer. In some embodiments, the first computer 120 is a desktop computer and the second computer 130 is a laptop. In various embodiments, the first computer 120 and the second computer 130 are laptop computers, desktop computers, or Windows tablets such as the Surface.

The first computer 120 can communicate with the first mobile device 125 and the second computer 130 can communicate with the second mobile device 135.

During operation, one or more mobile device users can be informed that data is to be collected from their mobile device. In the example of FIG. 1, there are two mobile devices. Assume the user of the first mobile device 125 and the user for the second mobile device 135 are informed that data is to be extracted from their respective mobile devices. The first mobile device 125 and the second mobile device 135 can be located in different locations (e.g., different parts of the world, different parts of a country, and/or any location from one another that is different). The first mobile device 125 can be coupled to (e.g., plugged into via a USB port) the first computer 120. The second mobile device 135 can be coupled to (e.g., plugged into via a USB port) the second computer 130. In various embodiments, the first mobile device is coupled to the first computer 120 via wifi.

The server 110 can transmit an agent application to the first computer 120. The server 110 can transmit an agent application to the second computer 130. The agent application can specify the exact data that is to be extracted from each of the first mobile device 125 and the second mobile device 135. In various embodiments, the data to be extracted from the first mobile device 125 and the second mobile device 135 can be the same, or different.

The first computer 120 and the second computer 130 communicates with the first mobile device 125 and the second mobile device, respectively, such that the requested data can be extracted, as is described in further detail below with respect to FIGS. 2 and 3.

Figure 2:
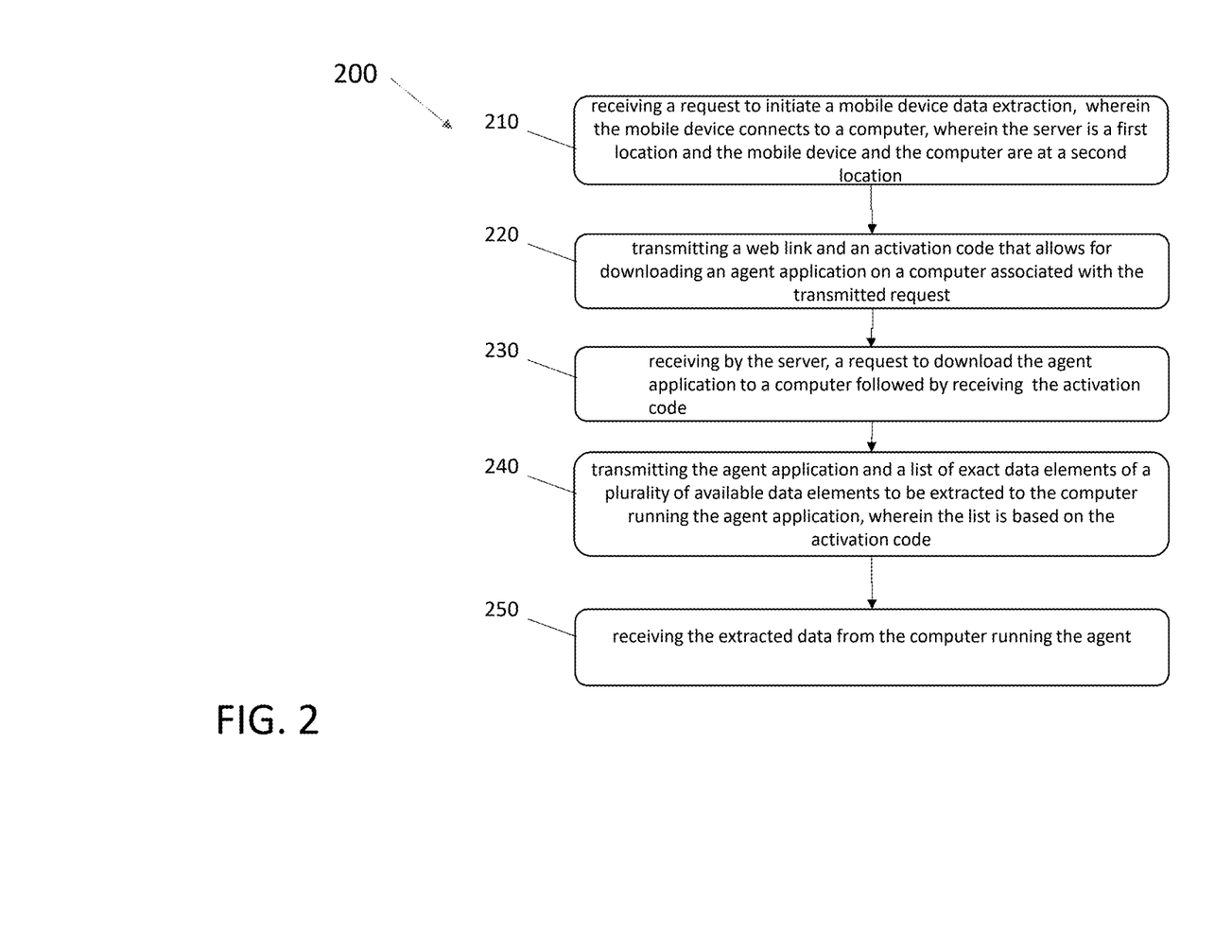
FIG. 2 is a flow diagram of a method for automatic remote mobile device data extraction, according to an illustrative embodiment of the invention.
Figure 4A:
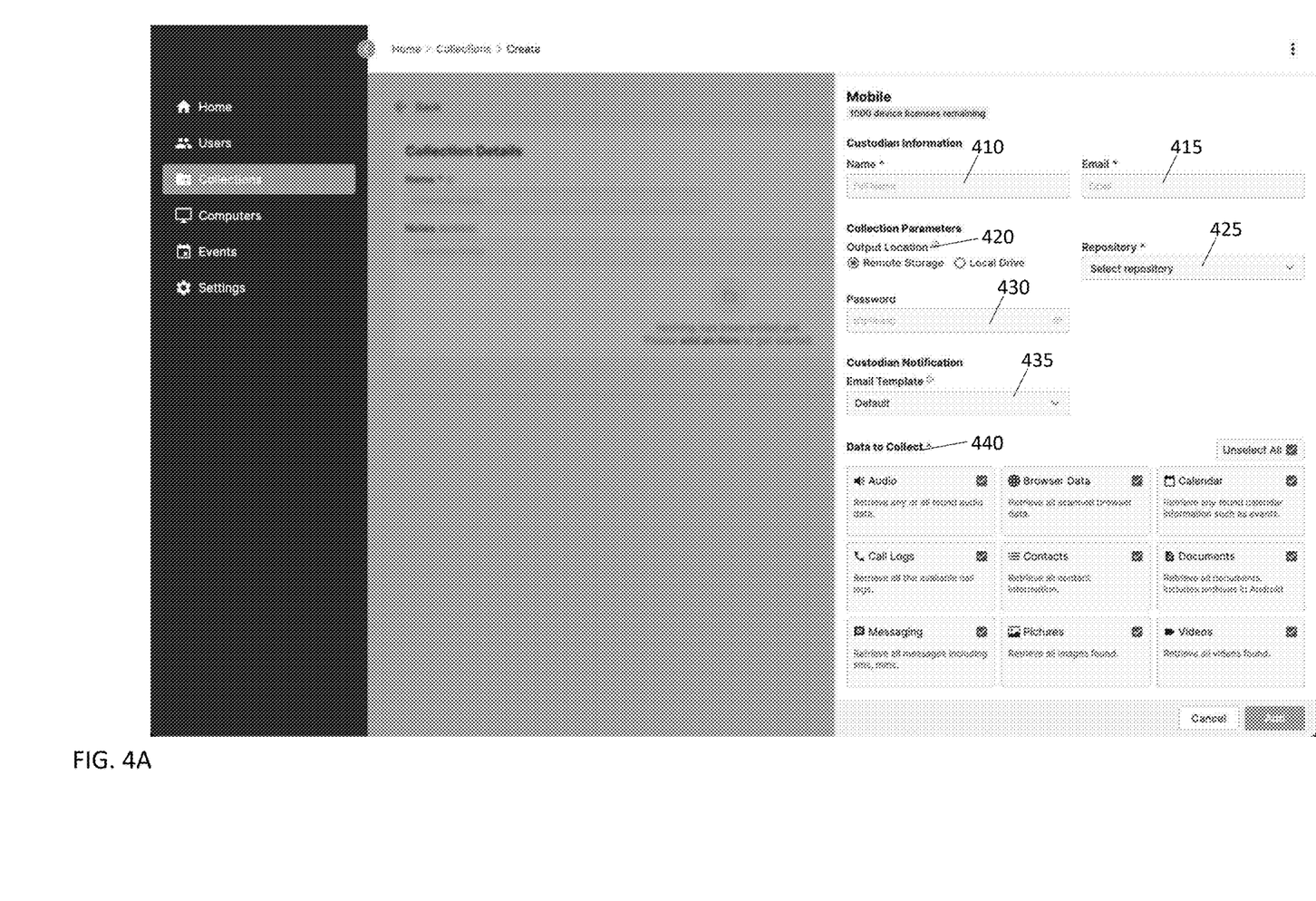
FIGS. 4A through 4G are screen shots of interfaces of a system for remote mobile device data extraction, according to an illustrative embodiment of the invention.

FIG. 2 is a flow diagram 200 of a method for automatic remote mobile device data extraction, according to an illustrative embodiment of the invention. The method can involve receiving (e.g., by the server 110 as described above in FIG. 1) a request to initiate a mobile device data extraction (Step 210). The request for the mobile data device extraction can be input by a user via a user interface (e.g., as shown in FIG. 4A). Turning to FIG. 4A, FIG. 4A is an example of a user interface 400 for inputting a request for data collection, according to some embodiments of the invention. The user interface 400 can include several input fields, for example, name 410, email 415, output location for collection parameters 420, repository 425, password 430, email template 435, and/or data to collect 440.

Turning back to FIG. 2, in some embodiments, the request is received via an input file or code. The request can specify exactly which data elements on the mobile device are the be collected. For example, the request can specify to collect messages, voicemails, photos, videos, calls, data collected in any specific applications (e.g., Facebook, WhatsApp or Snapchat), a date range for the collection, or any combination thereof. In some embodiments, the extraction can be for messages where the sender has a particular name or the receiver has a particular name. In various embodiments, the extraction can be for texts with certain recipients names and/or phone numbers.

The mobile device (e.g., the first mobile device 125 or the second mobile device 135 as described above with respect to FIG. 1) connects to a computer (e.g., the first computer 120 or the second computer 130 as described above with respect to FIG. 1). The connection can be wired through a USB port of the computer.

The server can be located at a first location and the mobile device and the computer can be located at a second location. In this manner, the invention can provide remote mobile device data extraction/collection capabilities, such that the mobile device custodian does not have to provide the physical mobile device to an investigator and the mobile device user and the investigator do not need to be in the same location for the mobile device data extraction.

The method can involve transmitting (e.g., by the server 110 as described above in FIG. 1), a web link and an activation code that allows for downloading an agent application on a computer associated with the transmitted request (Step 220). The activation code can be a base64 encoded string that contains the server location IP, a code, and a certificate check. The computer can be the computer that is coupled or that will be coupled to the mobile device. The web link can be a link to a location on the server where the agent application resides. The agent application can be specific to the computing device that transmits the request. For example, a computing device running the Microsoft Windows operating system can receive an executable agent for Microsoft Windows, and macOS computing device can receive an application for macOS.

For example, the agent application can include instructions to allow the computing device to connect to and extract the data specified in the request from the mobile device.

Figure 4B:
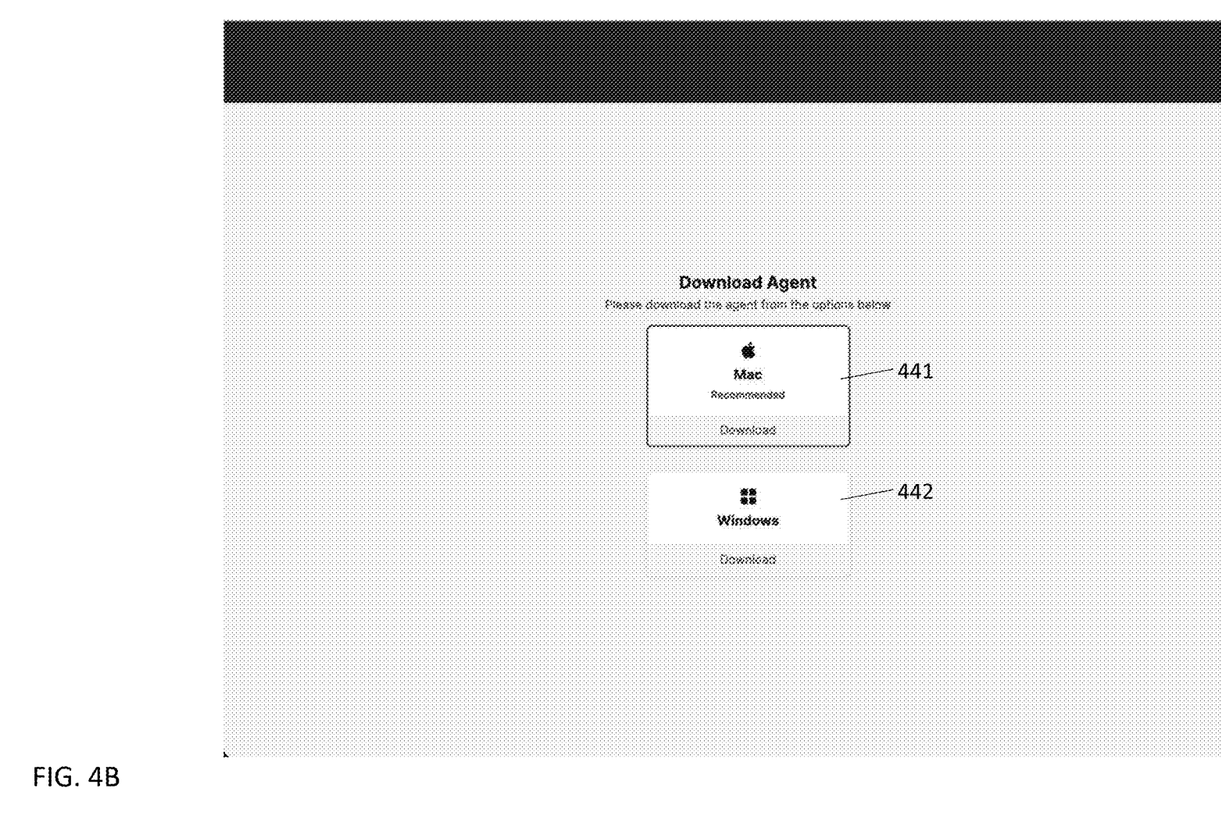

The method can involve receiving (e.g., by the server 110 as described above in FIG. 1), the activation code and a request to download the agent application, from a computer (Step 230). A link and the activation code can be received via email. Once the link is executed, a webpage can be displayed to a user, e.g., as shown in FIG. 4B. The user can click on the download button on the webpage as shown in FIG. 4B. Turning to FIG. 4B, FIG. 4B is an example of webpage displaying agent download options, according to some embodiments of the invention. As shown, there is a first download button for a iOS computer 441, and a second download button for a windows computer 442.

Figure 4C:
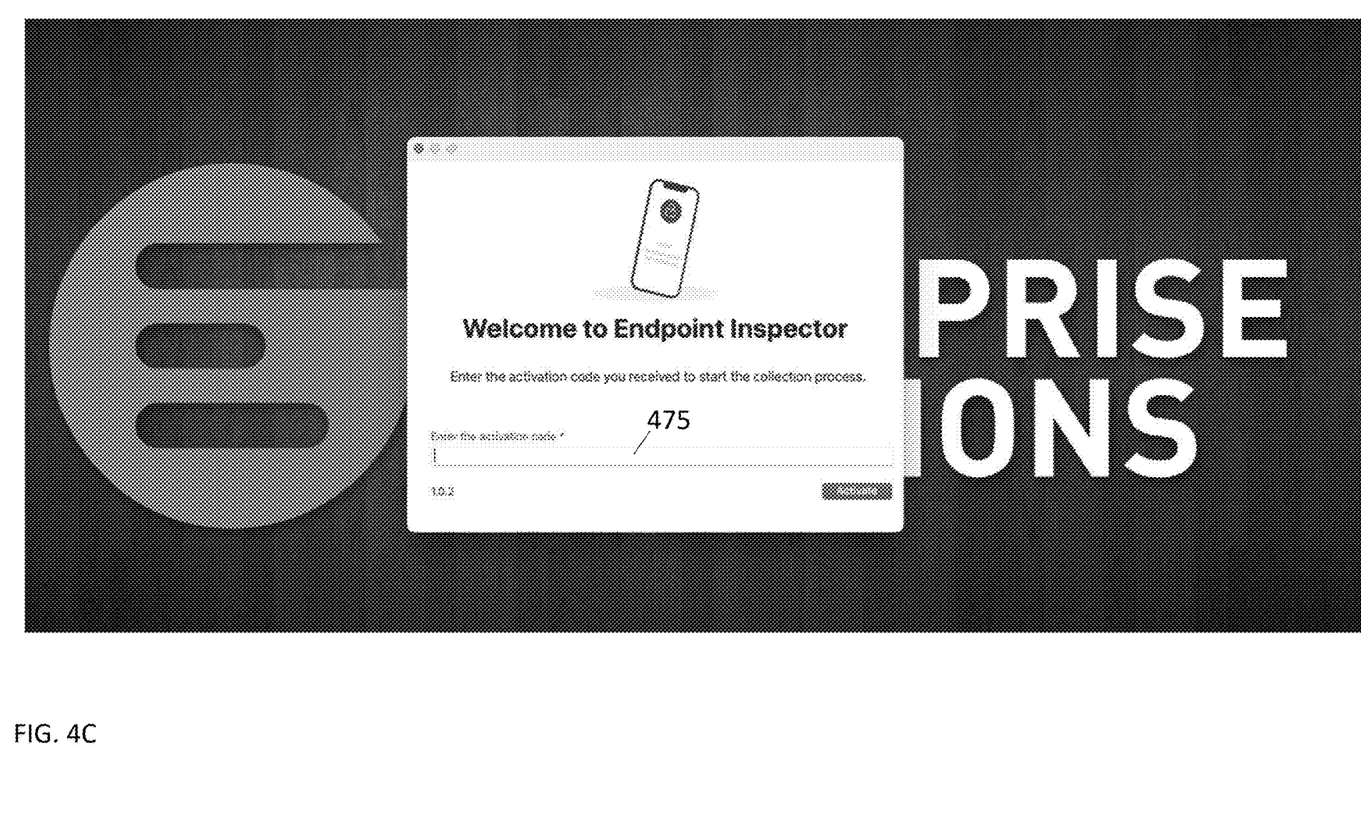

Turning back to FIG. 2, the method involves transmitting, (e.g., by the server 110 as described above in FIG. 1), the agent application (e.g., after the user clicks on the download button). The user can enter the activation code (e.g., via input 475 as shown in FIG. 4C). The method can also involve transmitting a list of exact data elements of a plurality of available data elements to be extracted to the computer running the agent application (e.g., the first computing device 120 or the second computing device 130 as described above in FIG. 1), wherein the list is based on the activation code (Step 240). The activation code can be associated with the data items received in the request so that when the activation code is used, the data items associated with the particular request can be used by the computer running the agent application to extract the data elements of interest (e.g., the data elements specified in the request). The data items to collect can be specified via a user interface (e.g., data to collect 440 as shown in FIG. 4A). For example, in some embodiments, the data items received in the request can be one or more of audio, browser data, calendar, call logs, contacts, documents, messaging, pictures, and videos, as shown in FIG. 4A.

The method can also involve receiving, (e.g., by the server 110 as described above in FIG. 1), the extracted data from the computer running the agent (Step 250). The agent application can communicate with the mobile device to extract the data element of interest and transmit the data elements of interest to the server, as described in further detail below with respect to FIG. 3.

Figure 3:
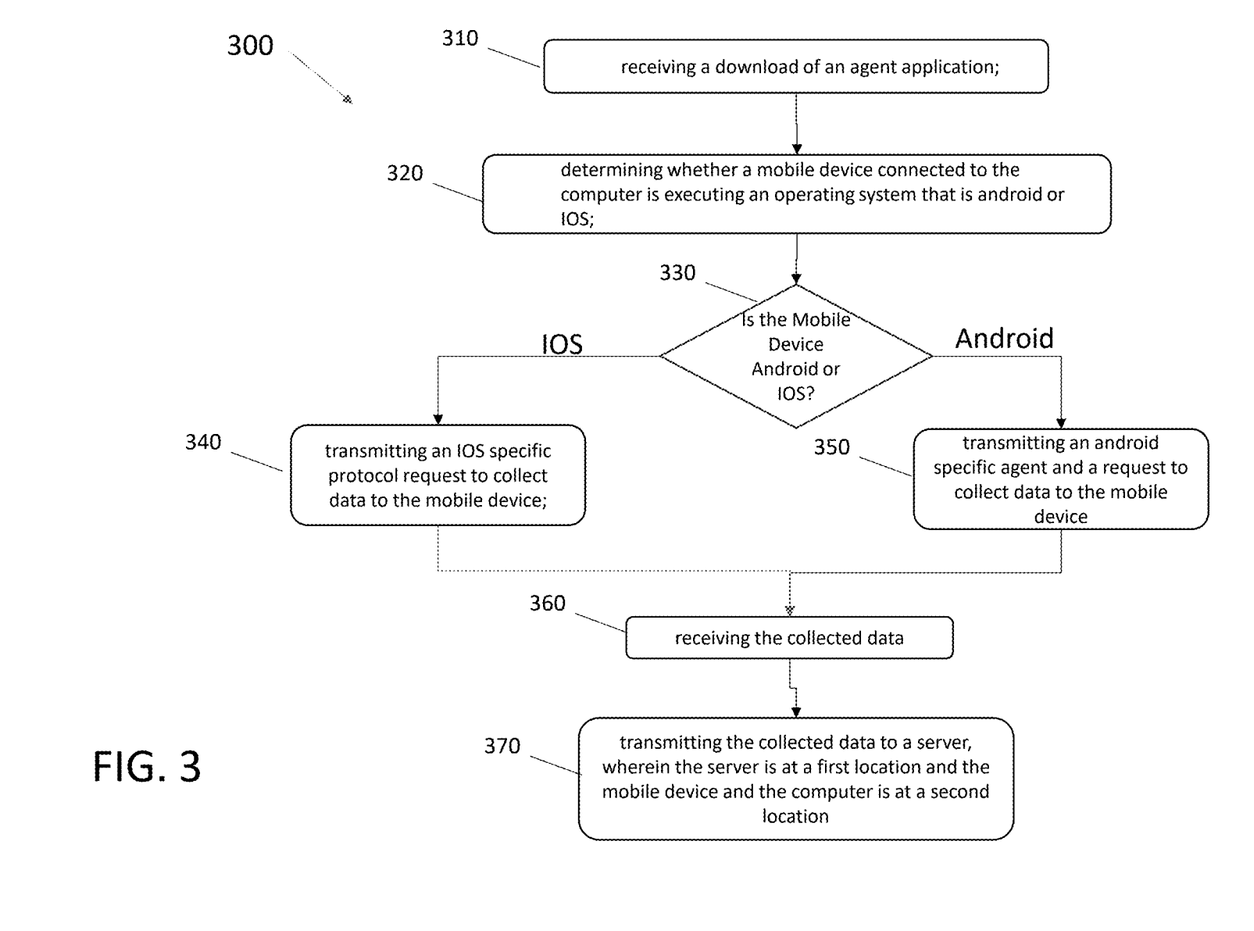
FIG. 3 is a flow diagram of a method for automatic remote mobile device data extraction, according to an illustrative embodiment of the invention.

FIG. 3 is a flow diagram of a method 300 for automatic remote mobile device data extraction, according to an illustrative embodiment of the invention.

Figure 4D:
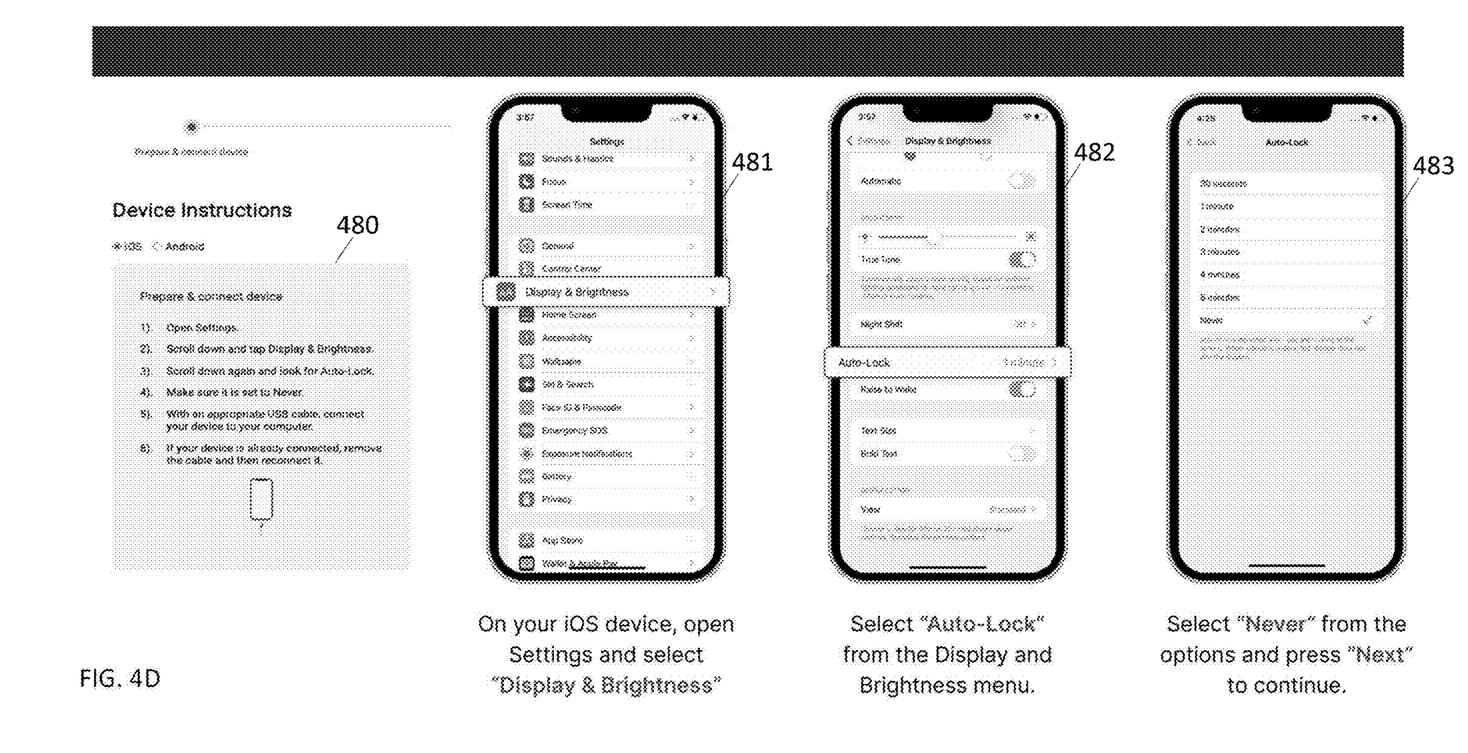
Figure 4E:
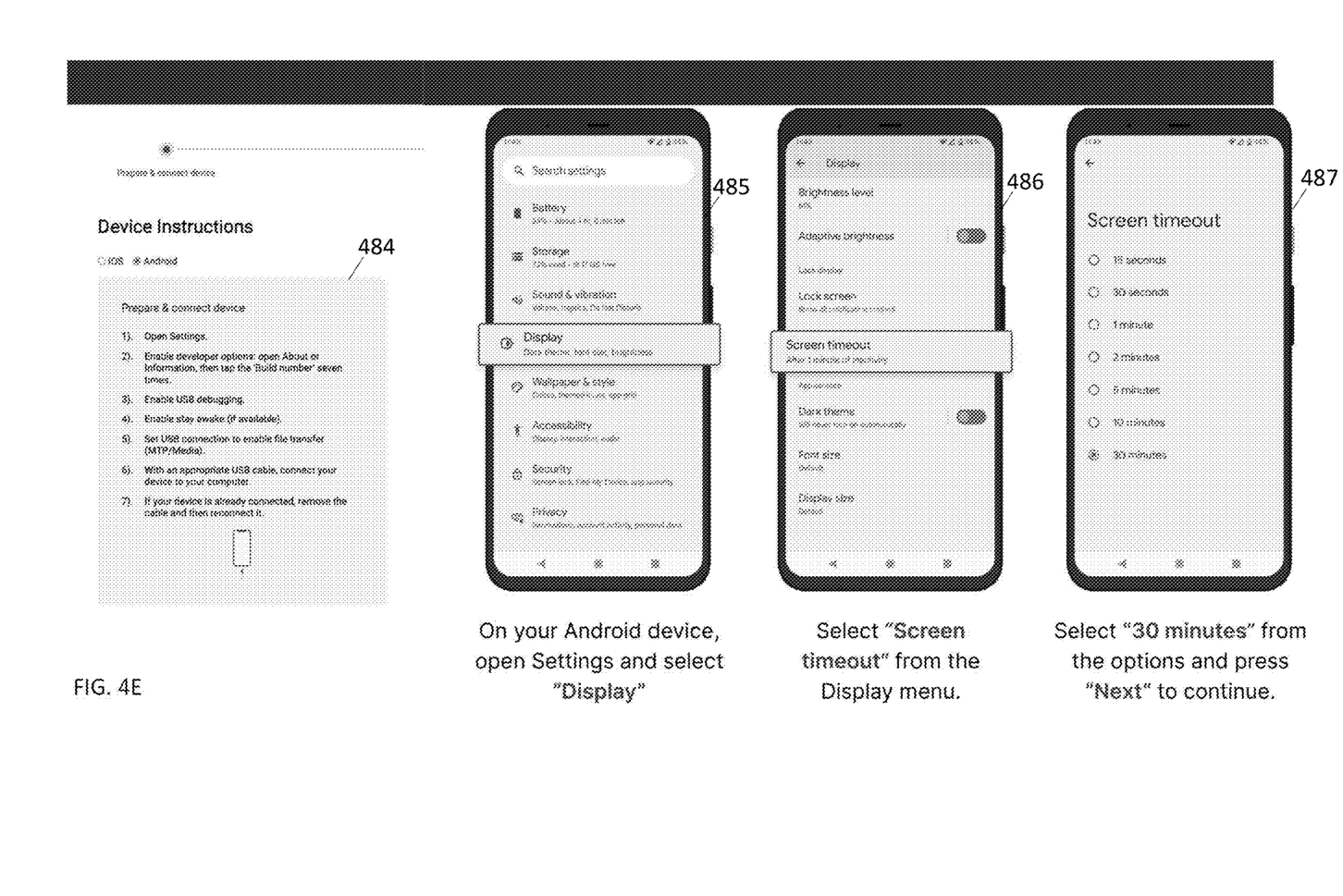

The method can also involve receiving (e.g., by the first computer 120 or the second computer 130 as described above in FIG. 1), a download of an agent application (Step 310). The agent application can cause a webpage to be displayed. FIGS. 4D and 4E are screen shots of webpages that can be displayed by the agent application, according to some embodiments of the invention. The webpages can display instructions that when executed can cause the mobile device to be prevented from shutting off and/or put into a special mode so that access to them can occur. FIG. 4D can be displayed if the mobile device is an iOS device, and FIG. 4E can be displayed if the mobile device is an Android device.

As shown in FIG. 4D, instructions 480 can be displayed to the iOS mobile device owner. Mobile device screen shots 481, 482, and 483 show examples of an iOS mobile device interface executing the instructions 480. For example, screen shot 481 shows an example of the iOS mobile with the "Display & Brightness" setting selected. Screen shot 482 show an example of the iOS mobile device interface with the "Auto-Lock" setting selected, and screen shot 483 shows setting the "Auto-Lock" setting to "Never."

FIG. 4E shows instructions 484 can be displayed to the Android mobile device owner. Mobile device screen shots 485, 486, and 487 show examples of an Android mobile device interface executing the instructions 484. For example, screen shot 485 shows an example of the Android mobile with the "Display" setting selected. Screen shot 486 show an example of the Android mobile device interface with the "Screen timeout" setting selected, and screen shot 487 shows setting the "Screen timeout" setting to "30 minutes."

The method can also involve determining, by the computer, whether a mobile device connected to the computer is executing an operating system that is android or iOS (Step 320).

The method can also involve determining if the mobile device is an iOS device or an android device (Step 330). The determination can be made by querying the mobile device for the model string.

If the mobile device is an iOS, then the method can also involve transmitting, (e.g., by the first computer 120 or the second computer 130 as described above in FIG. 1), an iOS specific protocol request to collect data from the mobile device.

The agent application can determine a model for the iOS mobile device. For example, particular pathways to obtain data can be different in different models of iOS mobile devices (e.g., through itunes backup, applemobilebackup or the like).

The agent application can connect to a lockdown service protocol of the iOS mobile device. The agent application can initiate a backup protocol of the iOS mobile device to extract the data. In some embodiments, if there is password set for the backup, the iOS mobile device can prompt a user to enter a key (e.g., password). In some embodiments, if there is no password set, the agent application sets a password and uses the password, as this can allow for greater accessibility of the iOS mobile device data.

Figure 4F:
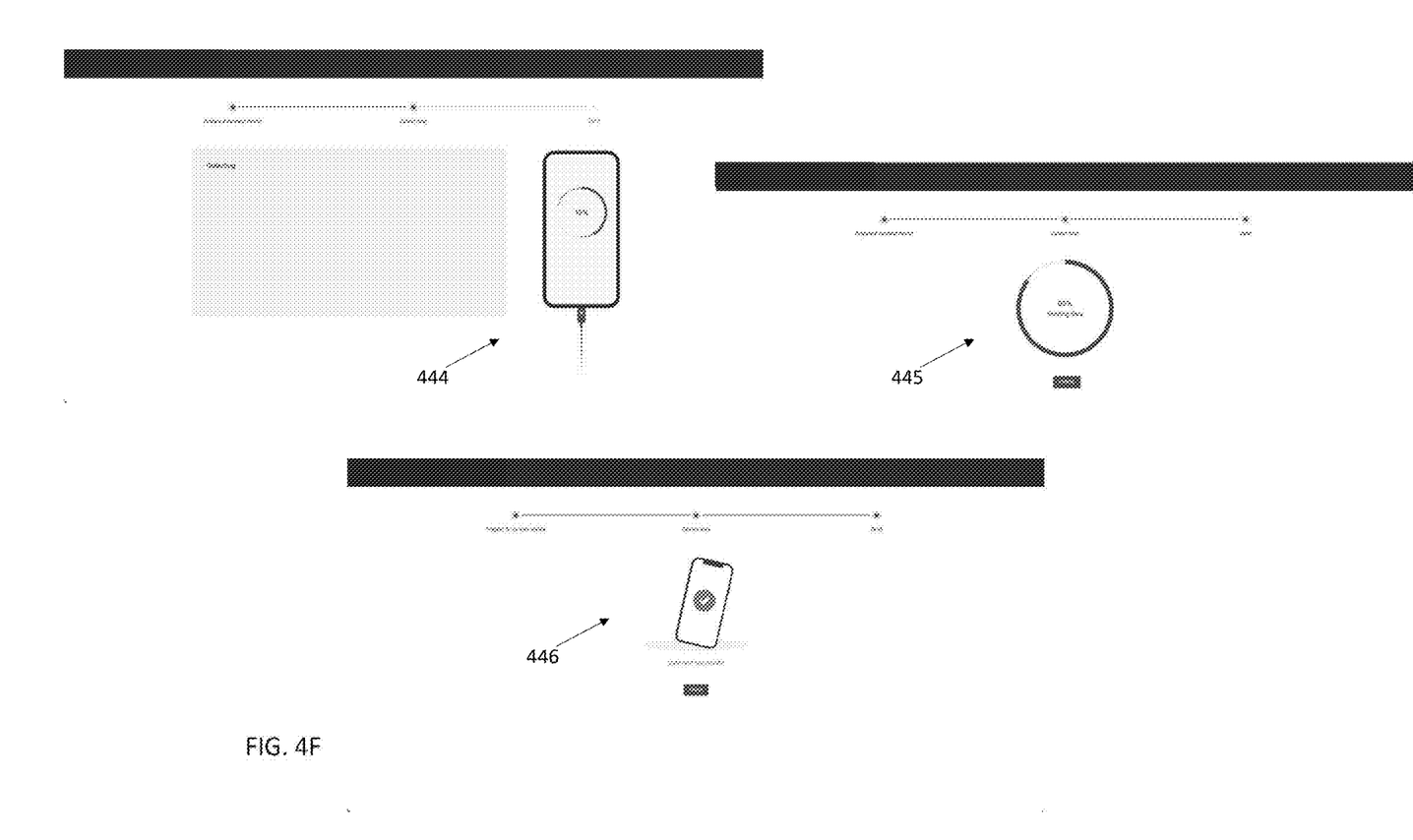

In some embodiments, as the data is being extracted, a progress screens can be displayed to the user, as shown in FIG. 4F. FIG. 4F are screen shots of a progress screen, according to some embodiments of the invention. Screen shot 444 is an example showing progress of the data collection on the mobile device. Screen shot 445 is an example of progress of the data being sent from the mobile device. Screen shot 446 is an example showing the data having been completely sent.

Turning back to FIG. 3, if the mobile device is an android device then the method can also involve transmitting, (e.g., by the first computer 120 or the second computer 130 as described above in FIG. 1), an android specific agent and a request to collect data from the mobile device (Step 350).

The agent application on the computer can communicate with the android specific agent on the mobile device that the computer is connected too. The agent application can communicate to the android specific agent via Android Device Bridge Protocol (ADB) to obtain the data from the mobile device specified by the agent application (e.g., the data in the request).

The method can also involve receiving, e.g., by the first computer 120 or the second computer 130 as described above in FIG. 1), the collected data (Step 360). In some embodiments, for an android mobile device, the android specific agent can uninstall from the mobile device once the extraction is complete.

The method can also involve transmitting the collected data, (e.g., by the first computer 120 or the second computer 130 as described above in FIG. 1), to a server (e.g., server 110 as described above in FIG. 1). The server can be at a first location and the mobile device and the computer can be at a second location.

For iOS device, only the requested items which have been filtered from the full collection are transmitted to the server.

For an android mobile device, the data extracted is only the data specified in the request.

In some embodiments, the agent application can connect to MTP (Media Transport Protocol) to obtain media files (e.g., video, pictures, mp4 format files and/or any native application) from the mobile device.

In some embodiments, for an android mobile device, USB settings of the computer can be modified depending on the model of the android. For example, a vendor id (vid) and a product id (pid) of the connected android mobile device can be obtained from a usb descriptor. A detection method can be selected from a list (e.g., file) of potential detection methods. For example, for a specific pid range, adb detection, mtp detection or both can be run to detect a specific brand and/or model of the connected android mobile device. A device configuration can be loaded, e.g., from a device xml database. Some android mobile device can have specific configurations to establish USB communication. The USB hierarchy can be device, then configuration, then interface, then endpoint. Communication can be made to/from an endpoint such that a configuration number, interface number and endpoint number can be set.

For example, the specific configurations can include set USB configuration to 3 (where the default one is typically 1), select specific USB interface number, and/or suppress mass storage mode if it exists. In some embodiments, a connection to AOA accessory mode can be changed to, for example, read the data faster. Any configuration changes to the android mobile device can be temporary, such that once the data is read, the configuration goes back to the original configuration.

In some embodiments, once the data is extracted it is compressed (e.g., into a UFD file compressed into a standard zip archive) and sent to a local or remote location chosen in the request. A UFD file is a file based image container for mobile devices. The data store can be a local device to the data owner (e.g., the first computer 120 as shown above in FIG. 1), a network shared folder, a secure FTP server, an Amazon S3—Cloud Object Storage location, a Microsoft Azure Blob—Cloud Storage location, or any other cloud storage location such as Dropbox, etc.

Figure 4G:
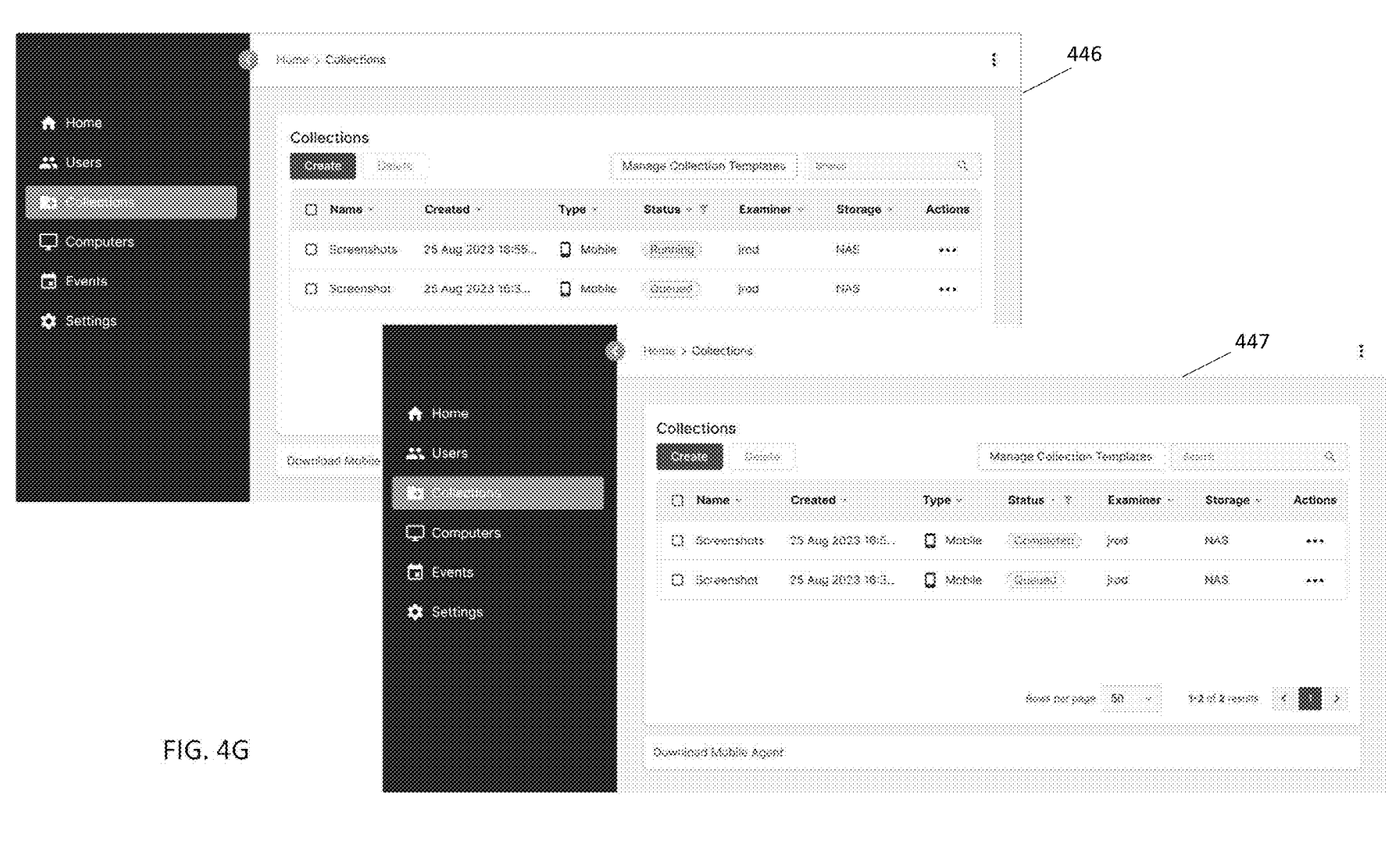

In some embodiments, the server (e.g., server 110 as shown above in FIG. 1) can be notified during each step of the process as described in FIG. 3 or at periodic points during the process. This can be done for example, for the Examiner to see a status of the collection (e.g., as shown in FIG. 4G) and to determine if any errors have been encountered. FIG. 4G show screen shots 446 and 447 which display collections that are in progress and/or completed, according to some embodiments of the invention.

Turning back to FIG. 3, if an error in collection happens, a different collection can be initiated based on the errors encountered (e.g., initiated by the Examiner or performed automatically).

In some embodiments, errors can happen in pushing the collection to a remote storage location so the collection still exists and the mobile data owner may not need to reconnect their device to the computer for the data to be recollected.

In some embodiments, once the collection and storage is completed the Examiner who created the request can be sent an email automatically notifying them of the extraction being completed.

Figure 5:
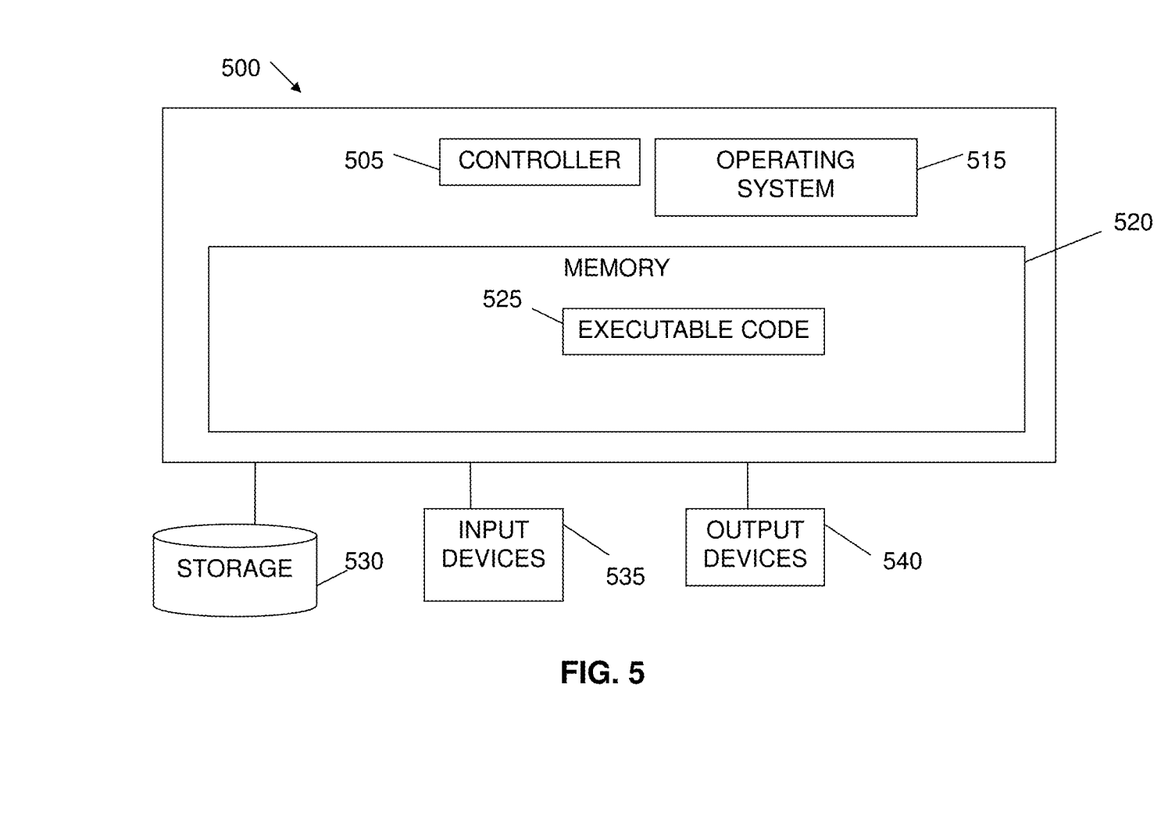
FIG. 5 is a block diagram of a computing device which can be used with embodiments of the invention.

FIG. 5 shows a block diagram of a computing device 500 which can be used with embodiments of the invention. Computing device 500 can include a controller or processor 505 that can be or include, for example, one or more central processing unit processor(s) (CPU), one or more Graphics Processing Unit(s) (GPU or GPGPU), a chip or any suitable computing or computational device, an operating system 515, a memory 520, a storage 530, input devices 535 and output devices 540.

Operating system 515 can be or can include any code segment designed and/or configured to perform tasks involving coordination, scheduling, arbitration, supervising, controlling or otherwise managing operation of computing device 500, for example, scheduling execution of programs. Memory 520 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 can be or can include a plurality of, possibly different memory units. Memory 520 can store for example, instructions to carry out a method (e.g. code 525), and/or data such as user responses, interruptions, etc.

Executable code 525 can be any executable code, e.g., an application, a program, a process, task or script. Executable code 525 can be executed by controller 505 possibly under control of operating system 515. For example, executable code 525 can when executed cause masking of personally identifiable information (PII), according to embodiments of the invention. In some embodiments, more than one computing device 500 or components of device 500 can be used for multiple functions described herein. For the various modules and functions described herein, one or more computing devices 500 or components of computing device 500 can be used. Devices that include components similar or different to those included in computing device 500 can be used, and can be connected to a network and used as a system. One or more processor(s) 505 can be configured to carry out embodiments of the invention by for example executing software or code. Storage 530 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 530 and can be loaded from storage 530 into a memory 520 where it can be processed by controller 505. In some embodiments, some of the components shown in FIG. 5 can be omitted.

Input devices 535 can be or can include for example a mouse, a keyboard, a touch screen or pad or any suitable input device. It will be recognized that any suitable number of input devices can be operatively connected to computing device 500 as shown by block 535. Set of devices 540 can include one or more displays, speakers and/or any other suitable output devices. It will be recognized that any suitable number of output devices can be operatively connected to computing device 500 as shown by block 540. Any applicable input/output (I/O) devices can be connected to computing device 500, for example, a wired or wireless network interface card (NIC), a modem, printer or facsimile machine, a universal serial bus (USB) device or external hard drive can be included in input devices 535 and/or output devices 540.

Embodiments of the invention can include one or more article(s) (e.g. memory 520 or storage 530) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

The invention claimed is:

1. A method for automatic remote mobile device data extraction, the method comprising:
   receiving, by the server, a request to initiate a mobile device data extraction, wherein a mobile device connects to a computer, wherein the server is at first location and the mobile device and the computer are at a second location;
   transmitting, by a server, a web link and an activation code that allows for downloading an agent application on a computer associated with the transmitted request;
   receiving, by the server, the activation code and a request to download the agent application from a computer;
   transmitting, by the server, the agent application and a list of exact data elements of a plurality of available data elements to be extracted to the computer running the agent application, wherein the list is based on the activation code due to a predetermined association between the activation code and the list; and
   receiving, by the server, the extracted data from the computer running the agent.

2. The method of claim 1 wherein the web link and the activation code are transmitted via email.

3. The method of claim 1 wherein the request to download the agent application includes a universal agent to collect mobile device data that is an android or an iOS.

4. A method for automatic remote mobile device data extraction, the method comprising:
   receiving, by a computer, a download of an agent application, wherein the agent application includes a list of exact data elements of a plurality of available data elements to be extracted, wherein the list is based on the activation code due to a predetermined association between the activation code and the list;
   determining, by the computer, whether a mobile device connected to the computer is executing an operating system that is android or iOS;
   if the mobile device is an android transmitting, by the computer, an android specific agent and a request to collect data to the mobile device;
   if the mobile device is an iOS transmitting, by the computer, an iOS specific protocol request to collect data to the mobile device;
   receiving, by the computer, the collected data; and
   transmitting the collected data, by the computer, to a server, wherein the server is at a first location and the mobile device and the computer are at a second location.

5. The method of claim 4 further comprising:
   for an android mobile device determining a model type of the android; and
   modifying, by the android specific agent executing on the computing device, USB settings of the computing device based on the model type.

6. The method of claim 4 further comprising if the mobile device is an android deleting, by the computing device, the android specific agent.

7. The method of claim 4 further comprising if the mobile device is an android connecting via Android Device Bridge to obtain the data from the mobile device specified by the agent application.

8. The method of claim 4 further comprising wherein if the mobile device is an android connecting via Media Transfer Protocol to obtain media from the mobile device specified by the agent application.

9. The method of claim 4 further comprising if the mobile device is executing iOS, determining a model type of the mobile device.

10. The method of claim 4 further comprising if the mobile device is executing iOS,
    connecting to a lockdown service protocol of the iOS;
    instantiating a backup protocol of the iOS; and
    receiving the data from the iOS.

11. The method of claim 10, further comprising setting a backup password.

12. A system for automatic remote mobile device data extraction, the system comprising:
    a server at a first location to transmit agent applications to computers upon receiving request to perform remote mobile device data extraction; and
    a computer at a second location to receive an agent application from the server, connect to a mobile device to extract data from the mobile device and transmit the extracted data to the server,
    wherein if the mobile device is an android, the computer is further configured to transmit an android specific agent and a request to collect data to the mobile device and if the mobile device is an iOS the computer is further configured to transmit an iOS specific protocol request to collect data to the mobile device,
    wherein the computer is further configured to receive the collected data from the mobile device, and
    wherein the server is further configured to upon receiving an activation code and a request to download an agent application from the computer, transmit the agent application and a list of exact data elements of a plurality of available data elements to be extracted to the computer running the agent application, wherein the list is based on the activation code due to a predetermined association between the activation code and the list.

13. The system of claim 12 wherein the computer is further configured to for an android mobile device, determine a model type of the android and modify, by the android specific agent executing on the computing device, USB settings of the computing device based on the model type.

14. The system of claim 12 wherein if the mobile device is an android, the computer is further configured to delete the android specific agent.

15. The system of claim 12 wherein if the mobile device is an android, the computer is further configured to connect via Android Device Bridge to obtain the data from the mobile device specified by the agent application.

16. The system of claim 12 wherein if the mobile device is an android, the computer is further configured to connecting via Media Transfer Protocol to obtain media from the mobile device specified by the agent application.

17. The system of claim 12 wherein if the mobile device is executing iOS, the computer is further configured to determine a model type of the mobile device.

\* \* \* \* \*